United States Patent
Lang

(10) Patent No.: US 12,446,829 B2
(45) Date of Patent: Oct. 21, 2025

(54) ELECTRODE FOR APPLICATION TO HUMAN SKIN

(71) Applicant: Leonh. Lang, Innsbruck (AT)

(72) Inventor: Burrhus Lang, Innsbruck (AT)

(73) Assignee: Leonh. Lang, Innsbruck (AT)

( * ) Notice: Subject to any disclaimer, the term of this patent is extended or adjusted under 35 U.S.C. 154(b) by 1402 days.

(21) Appl. No.: 16/384,152

(22) Filed: Apr. 15, 2019

(65) Prior Publication Data

US 2019/0254603 A1    Aug. 22, 2019

Related U.S. Application Data

(63) Continuation of application No. PCT/AT2017/060276, filed on Oct. 19, 2017.

(30) Foreign Application Priority Data

Oct. 21, 2016  (AT) .............................. A 50971/2016

(51) Int. Cl.
*A61B 5/00* (2006.01)
*A61B 5/259* (2021.01)
(Continued)

(52) U.S. Cl.
CPC ............ *A61B 5/6833* (2013.01); *A61B 5/259* (2021.01); *A61B 5/274* (2021.01); *A61B 5/291* (2021.01);
(Continued)

(58) Field of Classification Search
CPC ... A61B 2562/0215; A61B 5/25; A61B 5/282; A61B 5/291; A61B 5/259;
(Continued)

(56) References Cited

U.S. PATENT DOCUMENTS 3,845,757 A * 11/1974 Weyer .................... A61B 5/411
600/397
3,865,099 A * 2/1975 Robichaud ........... A61N 1/0492
600/397
(Continued)

FOREIGN PATENT DOCUMENTS

CN  101083937  12/2007
CN  101636865  1/2010
(Continued)

OTHER PUBLICATIONS

International Search Report issued Apr. 3, 2018 in International (PCT) Application No. PCT/AT2017/060276.

*Primary Examiner* — Joseph A Stoklosa
*Assistant Examiner* — Brian M Antiskay
(74) *Attorney, Agent, or Firm* — Wenderoth, Lind & Ponack, L.L.P.

(57) ABSTRACT

An electrode for application to the human skin, includes an electrically non-conductive support which on its upper side, facing away from the skin, has a protruding, electrically conductive connecting element with a terminal for removable connection of a signal conductor. A transverse conductor is provided which extends at least partially on the opposite, lower side of the support and is electrically coupled to the connecting element and to a contact medium facing the skin. The connecting element is made of a single piece, which on the one hand is connected to the transverse electrical conductor, and on the other hand has the terminal for releasable connection of a separate signal conductor.

35 Claims, 3 Drawing Sheets

(51) Int. Cl.
*A61B 5/274* (2021.01)
*A61B 5/291* (2021.01)
*A61N 1/04* (2006.01)
*H05K 7/02* (2006.01)

(52) U.S. Cl.
CPC .... *A61N 1/0492* (2013.01); *A61B 2562/0215* (2017.08); *A61B 2562/0217* (2017.08); *A61B 2562/125* (2013.01); *H05K 7/02* (2013.01)

(58) Field of Classification Search
CPC ............ A61B 2562/0217; A61B 5/296; A61B 2562/125; A61B 5/0006; A61B 5/6833; A61B 5/274; A61B 5/24; A61B 2560/0412; A61B 2562/164; A61B 5/6804; A61B 5/6831; A61B 5/6805; A61B 5/389; A61B 5/6823; A61B 5/332; A61N 1/0492; A61N 1/048; A61N 1/0484; A61N 1/04
USPC .......................................... 600/372, 382–395
See application file for complete search history.

(56) References Cited

U.S. PATENT DOCUMENTS

| | | | |
|---|---|---|---|
| 4,117,846 A * | 10/1978 | Williams | A61N 1/0456 606/32 |
| 4,706,680 A | 11/1987 | Keusch et al. | |
| 4,777,954 A | 10/1988 | Keusch et al. | |
| 5,730,126 A * | 3/1998 | Kantner | A61N 1/048 600/391 |
| 8,160,673 B2 | 4/2012 | Furtinger | |
| 8,329,138 B2 | 12/2012 | Tenne et al. | |
| 8,518,364 B2 | 8/2013 | Tenne et al. | |
| 8,880,140 B2 | 11/2014 | Hayes-Gill et al. | |
| 8,956,288 B2 | 2/2015 | Hafezi et al. | |
| 9,496,067 B2 | 11/2016 | Tenne et al. | |
| 9,731,108 B2 | 8/2017 | Mathew et al. | |
| 10,084,230 B2 | 9/2018 | Hong et al. | |
| 2001/0031988 A1 * | 10/2001 | Kurata | A61N 1/0408 607/2 |
| 2003/0120329 A1 | 6/2003 | Getsla et al. | |
| 2003/0134545 A1 | 7/2003 | McAdams et al. | |
| 2008/0058915 A1 | 3/2008 | Chang | |
| 2008/0071159 A1 | 3/2008 | Furtinger | |
| 2008/0132772 A1 | 6/2008 | Lang et al. | |
| 2009/0043185 A1 * | 2/2009 | McAdams | A61B 5/259 600/372 |
| 2010/0069717 A1 | 3/2010 | Hafezi et al. | |
| 2011/0306862 A1 | 12/2011 | Hayes-Gill et al. | |
| 2013/0109601 A1 | 5/2013 | Tenne et al. | |
| 2014/0180029 A1 | 6/2014 | Hansmann et al. | |
| 2015/0102939 A1 | 4/2015 | Hong et al. | |
| 2015/0141791 A1 * | 5/2015 | O'Neill | G01R 33/34084 600/391 |
| 2015/0230728 A1 | 8/2015 | Hafezi et al. | |
| 2016/0228691 A1 * | 8/2016 | Mathew | A61N 1/048 |
| 2017/0127969 A1 | 5/2017 | Su et al. | |

FOREIGN PATENT DOCUMENTS

| | | |
|---|---|---|
| CN | 102892709 | 1/2013 |
| CN | 103561644 | 2/2014 |
| CN | 105451805 | 3/2016 |
| DE | 37 88 755 | 6/1994 |
| DE | 20 2007 006 112 | 10/2008 |
| EP | 1 681 076 | 1/2006 |
| EP | 2 859 839 | 4/2015 |
| JP | 3-41403 | 4/1991 |
| JP | 9-313453 | 12/1997 |
| JP | 2002-233584 | 8/2002 |
| JP | 2008-520288 | 6/2008 |
| WO | 01/17423 | 3/2001 |
| WO | 2006/053366 | 5/2006 |
| WO | 2008/132148 | 11/2008 |
| WO | 2016/001393 | 1/2016 |

* cited by examiner

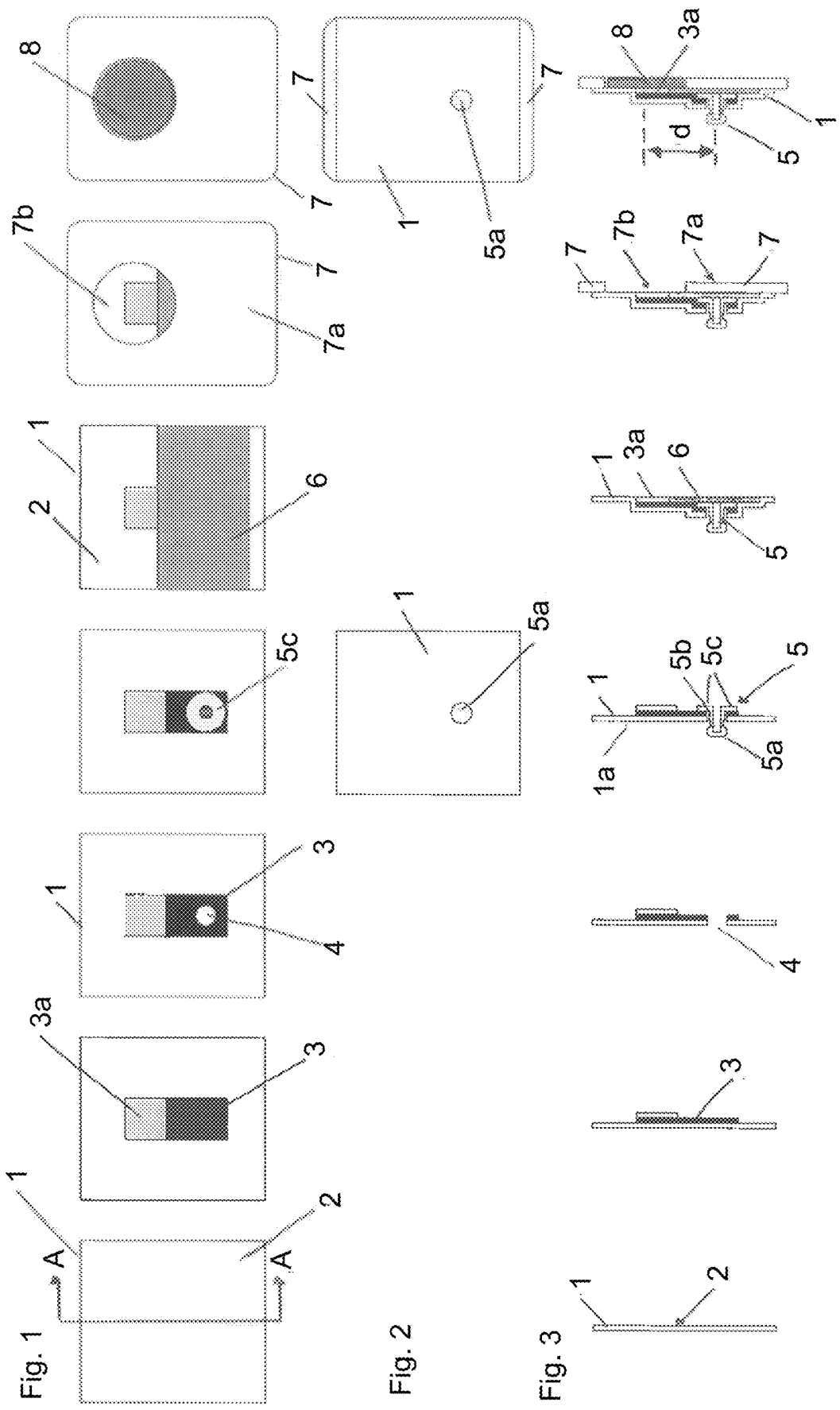

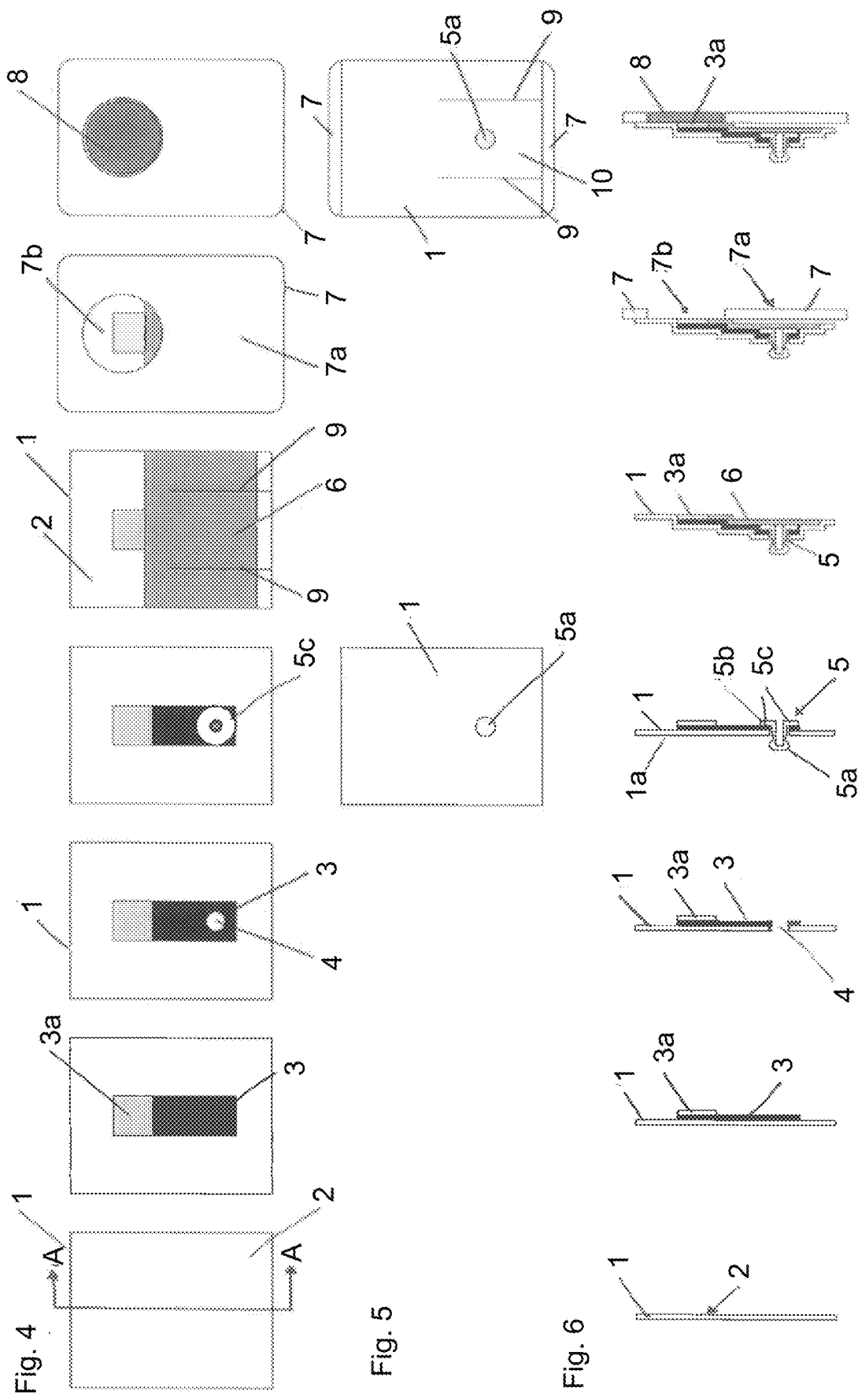

ELECTRODE FOR APPLICATION TO HUMAN SKIN

BACKGROUND OF THE INVENTION

The invention concerns an electrode and a method of producing an electrode.

Such medical skin electrodes can be used as measuring electrodes which derive electrical signals from the human body. They can however also be used as therapy electrodes for feeding currents to the human body. The electrodes are glued to the skin for this purpose and generally have on their underside an electrically conductive gel or another electrical contact medium which is in galvanic contact with a connecting element of the electrode. An electrical signal conductor can be connected to that connecting element, by way of which currents can be derived from the electrode or can be supplied to the electrode.

One type of electrodes has at the top side facing away from the skin a projecting electrically conductive connecting element with a connection location which is usually substantially in the form of a spherical head adjoined by a neck.

In the previous structure of electrodes of that type the connecting element was made in two parts. The upper part (top knob, stud) serves as a contact and anchor element for commercially available signal conductors, for example ECG cables. Substantially beneath the carrier, that is to say on the side facing the skin, there is a lower knob (eyelet) which serves to take electrical potential directly from the gel (contact medium) or transfer it to the gel. In that case the eyelet is connected both electrically and mechanically to the stud and more specifically in general by riveting the two parts in such a way that the carrier material of the electrode is firmly clamped between a flange-like laterally projecting holding region of the stud and a similar holding region of the eyelet. On the one hand such a structure provides a good mechanical hold for the connecting element on the carrier of the electrode and on the other hand makes it possible to manufacture the eyelet from materials which have favourable electrical properties for a signal electrode, for example for that purpose it can be coated with silver, the silver layer in turn being covered over the entire surface or at least in a partial area which is in contact with the gel, with a layer of silver/silver chloride (Ag/AgCl). There is also the possibility of the eyelet not touching the gel directly. Then a transverse conductor is provided in these so-called off-centre signal electrodes, which connects the eyelet to the gel.

However the electrodes in the state of the art are expensive—in which respect minor price differences are already a significant factor in such mass-produced articles.

The object of the invention is therefore to provide an electrode of the kind set forth in the opening part of this specification, which can be produced more cheaply and nonetheless provides good mechanical anchoring of the connecting element in the electrode and good electrical properties.

SUMMARY OF THE INVENTION

In contrast to the conventional two-part structure in which the connecting element consists of two parts (stud and eyelet) riveted together, according to the invention there is now a single part as a connecting element, which on the one hand provides the connection location for releasably connecting a signal conductor and on the other hand is connected to the electrical transverse conductor (preferably galvanically). In this case, the single part of the connecting element may itself comprise a plurality of materials, for example nickel-plated brass or a plastic doped with conductive material (in particular carbon fibres). However, in contrast to the previous two-part structure of eyelet and stud it represents a structural unit in the sense of a single part.

A particularly preferred embodiment of the connecting element is one in which it is of such a configuration that the connecting element has a substantially spherical head, an adjoining reduced-diameter neck and a flange-shaped laterally projecting holding region at the end of the neck remote from the head. Standard signal conductors can be easily releasably connected by way of the spherical head. The reduced-diameter neck is guided (preferably without lateral contact) through an opening in the carrier while the flange-shaped laterally projecting holding region is connected, preferably glued, to the underside of the carrier or to a layer-shaped transverse conductor mounted thereto. The enlarged-diameter flange-shaped laterally projecting holding region also securely holds the connecting element firmly to the carrier material with high tensile loads.

In order to ensure a good hold even under pressure loads on the connecting element it is preferably provided that the connecting element has a laterally projecting holding region which is arranged between a support layer and the carrier, wherein the support layer laterally extends beyond the holding region of the connecting element and is there firmly connected to the carrier-preferably glued.

Forces exerted on the connecting element by pressure loads are carried on the one hand by the gluing of the holding region to the underside of the carrier or the transverse conductor provided there, and on the other hand by the supporting layer which diverts those forces laterally into the carrier.

No high demands are made on the electrical properties of the holding element in the subject-matter of the invention. It can therefore comprise inexpensive material, for example a simple sheet metal. More specifically the holding element does not need to have any special electrical properties for only the transverse conductor which is connected to the electrical contact medium can have those electrical properties which are desirable for bioelectrodes.

Redox pairs are currently used to achieve low noise and depolarisation in an electrode in the event of defibrillation. Those can be oxidized or reduced and in that case absorb at least one electron or release at least one electron. At the present time the most widely varying substances are used for such depolarisation. Silver/silver chloride and tin/tin chloride are most frequently used. All redox pairs are conceivable for the present invention however, which allow depolarisation of the electrode. The redox pairs can be actively incorporated or possibly generated in situ by reactions.

As, for example, silver/silver chloride is a relatively expensive substance, it is sufficient if, according to a further aspect of the invention, it is provided that the transverse conductor has at least two different electrically conductive materials, one of which is galvanically connected to the connecting element and one another is galvanically connected to the contact medium.

Making the transverse conductor of at least two different materials makes it possible further to save costs. The actual transverse conductor can be made more specifically from relatively inexpensive materials, for example metal or plastic provided with conductive carbon fibres while a second material like for example silver/silver chloride can be used at the transitional region, that is critical in regard to the desirable electrical properties of the bioelectrode, to the electrical contact medium (especially gel). It is sufficient if that material is present only locally in that region.

Overall the invention is based on the basic idea of designing the connecting element for the signal conductor in such a way that it is securely anchored in the electrode while the electrical properties are less important and therefore cost-effective materials can be used. On the other hand the more expensive materials provided for favourable electrical signal conduction can be used only in the electrically critical region at the transition to the electrical contact medium (gel). This task is performed by the transverse conductor. In brief terms it would be said that the electrically conductive connecting element is primarily responsible for the "mechanics", apart from the basic property of electrical conduction. It is the other way around with the transverse conductor: it does not need to fulfil any special mechanical properties and it is only in the region of the transitional location to the electrical contact medium (gel) that it comprises materials which are appropriate for that purpose. In that respect the transverse conductor is responsible for the "electrics" without any special mechanical functions for it to perform.

BRIEF DESCRIPTION OF DRAWINGS

Further advantages and details of the invention are described more fully with reference to the following description of the drawings, in which:

FIG. 1 is in a diagrammatic view from below (later the side towards the skin) the production steps of an embodiment of an electrode according to the invention to the finished electrode, FIG. 2 is a corresponding plan view, wherein only a part of the method steps is shown in a plan view, FIG. 3 shows the sequence of sections along the line A-A of FIG. 1, wherein the representation is to be interpreted for better visualization as a diagrammatic illustration. In reality the layer sequence can be of different dimensioning, as is usual with medical electrodes, FIGS. 4, 5 and 6 show substantially the same illustrations as in FIGS. 1, 2 and 3, but for another embodiment.

DETAILED DESCRIPTION OF THE INVENTION

Figure 7:
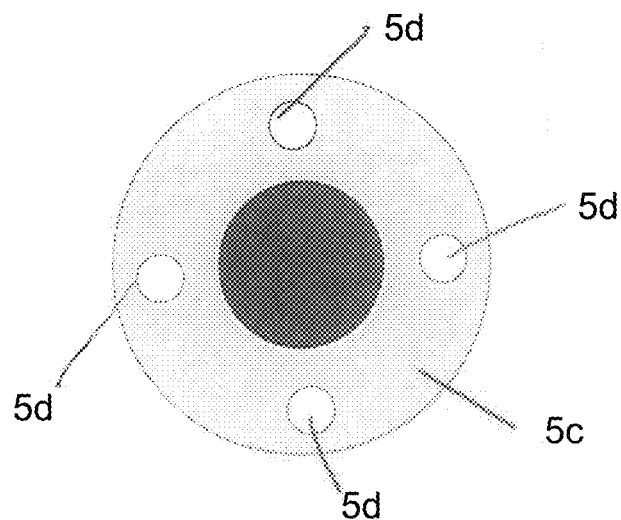
FIGS. 7 and 8 are views from below of embodiments of an electrical connecting element.

The basic starting point is an electrically non-conductive carrier 1. The carrier material serves to anchor the electrical components of the electrode. It may for example comprise a (flexible) film (for example, PET or TPU), which is coated on the underside facing upwardly in the drawing of FIG. 1 with an adhesive 2 which, for example, can be self-adhesive (pressure sensitive adhesive) or thermally activatable (hot melt).

A strip-shaped transverse conductor 3 is now attached, in particular glued, to the carrier material, in a next step. According to a preferred variant of the invention the transverse conductor has two differently electrically conductive materials, one of which is later galvanically connected to the electrical connecting element and while the other is galvanically connected to the contact medium (gel).

The illustrated embodiment is a strip-shaped conductor shown in black, made of a plastic doped with conductive carbon fibres. In the region of the later contact location with the electrical contact medium (gel) the transverse conductor 3 (first material) is coated with a second electrically conductive material, for example, a layer 3a of silver/silver chloride or tin/tin chloride or another redox pair.

Preferably that layer 3a provided for the appropriate electrical properties from the contact location to the later gel is only provided where the gel is later provided. Otherwise a "normal" conductor 3, which is considerably less expensive, is sufficient to produce the electrical connection to the electrical connecting element described below.

In a further step a bore 4 is now provided through the electrical transverse conductor 3 and the carrier 1. This can be done for example by punching. There then follows the introduction of the electrically conductive connecting element 5 which has a substantially spherical-head-shaped connection location 5a for releasably connecting a commercially usual signal conductor (not shown) and which projects beyond the top side 1a of the carrier 1.

In the illustrated embodiment, adjoining the substantially spherical head (connection location 5a) the electrical connecting element has a reduced-diameter neck 5b on which finally a flange-like laterally projecting holding region 5c is disposed at the end facing away from the head (connection location 5a).

Overall, the laterally projecting flange-shaped holding region 5c has a substantially plate-shaped configuration. On the one hand, it serves for making electrical contact with the transverse conductor 3, by being "clamped" between the carrier 1 and the plate-shaped holding region 5c. On the other hand, the plate-shaped flange serves for producing the mechanical hold of the electrical connecting element, in particular against tensile loads which can be exerted by a signal cable on the head (connection location 5a) and thus the entire connecting element 5.

Preferably, an electrically conductive adhesive is provided between the transverse conductor 3 and the connecting element 5 or a holding region 5c projecting laterally therefrom.

In contrast to the hitherto usual riveted two-piece connecting elements comprising the upwardly projecting stud (top knob) and the subjacent eyelet (lower knob), according to the invention a connecting element 5 is used, which comprises a single part, which is connected on the one hand to the electrical transverse conductor 3 and on the other hand has the connection location 5a for releasably connecting a signal conductor (not shown here). This permits cost-effective production of the electrode because the mostly expensive eyelet (lower knob) can be omitted. The one-part design of the connecting element is sufficient for the mechanical anchoring effect.

The demands in terms of the electrical properties are low. This means simple structures, for example a deep-drawn metal part, can be used as a connecting element 5. The somewhat more difficult electrical functions are therefore not performed here by the otherwise usual eyelet (lower knob) but that end of the transverse conductor 3, which is in communication with the subsequently applied electrical contact medium (gel). This therefore involves a separation of tasks. Apart from the basic property of being electrically conductive the electrical connecting element is substantially responsible for the mechanical hold in the electrode while the transverse conductor is largely free of mechanical tasks. This makes it possible to make a favourable choice of material. In particular, it is possible to provide more expensive materials-which are favorable from an electrical point of view-only (layer 3a) where contact with the gel later takes place.

The electrically conductive connecting element can comprise a deep-drawn metal sheet, as already mentioned. It is then at least partially hollow inside. It may, however, also consist of a conductive plastic, for example, ABS, which is doped with conductive carbon fibres.

Desirably, the connecting element will be substantially rotationally symmetrical. Other variants are also possible.

In order to fix the electrical connecting element 5 definitively in the electrode and in particular to secure it against pressure loads on the head (connection location 5a) a support layer 6 is applied in a next step. The support layer 6 may for example comprise a double-sided adhesive tape which is glued on the underside in FIG. 1 to the connecting element 5 (specifically to the plate-shaped holding region 5c) and to regions of the underside 1a of the carrier 1.

In that case, pressure can be exerted on the layers so that they are correspondingly contoured and connect with each other. However the cross section shown in FIG. 3 after attaching the support layer 6 with the edges shown there is only to be seen as a diagrammatic representation. In actual fact the layer thicknesses are usually smaller and the layouts of the layers are substantially more rounded.

The double-sided adhesive tape (support layer 6) which is glued to the carrier 1, the electrical transverse conductor 3, and the holding region 5c of the electrical connecting element 5 on the one side, is now glued on the other side with a plaster layer 7, and the plaster layer can be glued to the skin, preferably by means of a patient-side coating made of biocompatible adhesive to fix the electrode.

Contrary to the illustrated embodiments, the support layer can also be formed directly from the plaster layer (without interposed double-sided adhesive tape). In that case, it is also possible to glue the plaster layer to the carrier 1 and the holding region 5c of the connecting element 5 by way of a layer of self-adhesive applied to it or a thermally activatable adhesive.

Reference will now be made back to the embodiment of FIGS. 1 to 3. The plaster material 7 shown there is firmly connected to the carrier 1 not only by way of the double-sided adhesive tape (support layer 6), but also the adhesive on the underside 2 of the carrier 1.

The plaster material finally serves to fix the electrode on the patient's skin. Suitable plaster materials may for example comprise a film (for example PE), a foam tape (for example PE foam) or non-woven materials. The plaster materials are usually coated on the patient side with a biocompatible adhesive 7a.

A final production step of the electrode shown in FIGS. 1 to 3 involves the introduction of the electrical contact medium into a recess 7b provided in the plaster material 7 for that purpose. The electrical contact medium allows the (preferably ion-based) conduction of body-generated electrical potentials or device-generated measurement or stimulation currents from the body surface (skin) to the electrical contact element and vice versa. The contact medium may comprise for example a chloride-doped gel which is present either in more or less liquid form (more or less gelled) or as a crosslinked polymer matrix (hydrogel). However, it is also possible to produce the electrical contact medium by other means, for example as a conductive adhesive or as a saline-filled sponge.

At any event, the electrical contact medium 8, as is shown by the last step in FIGS. 1 to 3, is introduced into the recess 7b. It contacts therein the end region of layer 3a (there is the second material of the transverse conductor, in particular silver/silver chloride).

The co-operation of the specially-designed end region of the transverse conductor 3, in particular the coating with silver/silver chloride or another suitable material on the one hand and the material of the electrically conductive contact medium 8 on the other hand, makes it possible to achieve favorable electrical properties of the electrode, for example noise-free signal transmission or depolarizing effects. The use of the relatively expensive second material in layer 3a at the end of the transverse conductor 3 can remain restricted to that region in which contact with the contact medium 8 takes place. This further reduces the costs.

Overall, the production as shown in FIGS. 1 to 3 gives a "decentralized" electrode, in which the connecting element 5 on the one hand and the contact medium 8 (gel) on the other hand are arranged on the carrier 1 at laterally mutually displaced locations (distance d).

The method steps essential for the embodiment shown in FIGS. 1 to 3 are the following:

applying, preferably by thermally activated gluing, a strip-shaped transverse conductor to the underside facing the skin of an electrically non-conductive carrier, producing, preferably by punching, a through opening through the transverse conductor and the carrier, introducing a one-piece connecting element from the underside of the carrier into the opening, such that a connection location for a signal conductor projects on the opposite top side of the carrier and the connecting element bears with a laterally projecting—preferably plate-shaped holding region against the transverse conductor, and covering the holding region of the connecting element with a support layer which is glued to the carrier laterally beside the holding region.

Finally, the following steps are then also effected to complete the electrode:

applying, preferably gluing, a plaster layer which is adhesive on the skin side to the carrier and/or the support layer, and introducing an electrical contact medium-preferably a gel-into a recess of the plaster layer such that the subjacent transverse conductor is contacted.

In the embodiment illustrated in FIGS. 4 to 6, most of the method steps are the same as those in FIGS. 1 to 3, for which reason the same reference numerals denote the same parts.

The difference is essentially in step 5. Specifically as shown in FIG. 4 two incisions 9 are made through the entire composite. In the next step, the plaster material 7 is then glued only in the upper region and at the bottom to the "wings" (for example, by local thermal activation), but not in the region of the flap which thereby remains movable.

Overall the embodiment shown in FIGS. 4 to 6 involves a movable flap 10 which carries the connecting element 5 with the connection location 5a. The movable flap can compensate for tensile loads on the signal conductor (not shown) and thus on the connection location 5a, so that same is not transmitted fully to the electrode. Overall this improves the adhesion of the electrode to the skin of the patient.

FIG. 7 shows an embodiment by way of example of a holding region 5c which projects laterally from the connecting element 5 in the form of a flange. This holding region or flange has bores 5d. When gluing the electrode adhesive penetrates into those bores and thus improves the adhesion and resistance to rotation of the connecting element with the parts of the rest of the electrode.

Figure 8:
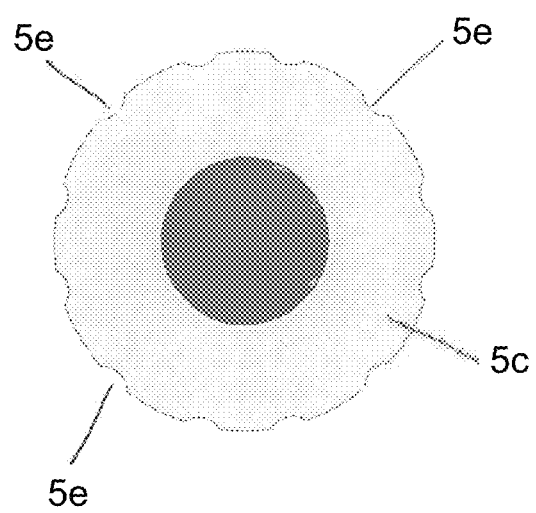

The embodiment shown in FIG. 8 serves for the same purpose. Here indentations 5e are provided at the peripheral edge of the plate-shaped holding region. The hot melt adhesive also penetrates thereinto and thus improves adhesion.

The signal conductor (not shown) has a known configuration and usually comprises an insulated flexible cable which leads from an evaluation device or power supply to the electrode. The signal conductor itself is not part of the electrode, that is to say it is formed separately from same and its connecting element. At its electrode end, the signal conductor usually carries a coupling portion, by way of which it is mechanically and electrically releasably connectable to the connection location of the connecting element of the electrode, which in turn is preferably pre-mounted on the electrode and permanently connected thereto.

The invention claimed is:

1. An electrode for application to human skin, comprising:
   an electrically non-conductive carrier having a top side and an underside opposite the top side, the underside being configured to face skin of a user;
   an electrically conductive connecting element projecting from the top side of the carrier remote from the skin, the connecting element having a connection location for releasably connecting a separate signal conductor; and
   a transverse conductor arranged so as to electrically connect the connecting element to a contact medium facing the skin,
   wherein the connecting element is formed of a single part which is in connected relationship with the transverse conductor and has the connection location for releasably connecting the separate signal conductor,
   wherein the connecting element and the contact medium are arranged at laterally mutually displaced locations on the carrier,
   wherein the transverse conductor is flat and is attached to the underside of the carrier,
   wherein the connecting element has a holding flange which projects laterally from the connecting element, the holding flange being attached to an underside of the transverse conductor such that the holding flange is spaced apart from the underside of the carrier via the transverse conductor, and such that the connecting element is only connected to the carrier on the underside of the carrier,
   wherein a support layer is attached to an underside of the holding flange such that the holding flange is arranged between the support layer and the underside of the transverse conductor relative to a thickness direction, and wherein the support layer extends laterally beyond the holding flange of the connecting element such that laterally outer portions of the support layer are connected to the underside of the carrier, and
   wherein the connecting element projects through an opening in the carrier.

2. The electrode according to claim 1, wherein the connecting element comprises metal or conductive plastic.

3. The electrode according to claim 1, wherein the connecting element has a substantially spherical head, and a reduced-diameter neck adjoining the head, and wherein the holding flange is arranged at an end of the neck remote from the head.

4. The electrode according to claim 3, wherein the holding flange is plate-shaped.

5. The electrode according to claim 1, wherein the connecting element is overall of a substantially rotationally symmetrical configuration.

6. The electrode according to claim 1, wherein the contact medium is a gel in the form of a conductive adhesive or a saline-filled sponge.

7. The electrode according to claim 1, wherein the support layer is in the form of a double-sided adhesive tape or a tape made of a thermally activatable adhesive or a tape made of a thermoplastic material suitable for direct thermoplastic connection to the carrier, and is glued on one side with the connecting element and the carrier.

8. The electrode according to claim 7, wherein the double-sided adhesive tape is glued on the other side with a plaster layer, wherein the plaster can be glued on the skin to fix the electrode.

9. The electrode according to claim 1, wherein the support layer is formed by a plaster layer, wherein the plaster layer can be glued on the skin to fix the electrode.

10. The electrode according to claim 9, wherein the plaster layer is glued to the carrier and the holding flange of the connecting element by means of a layer applied thereto of self-adhesive or a thermally activatable adhesive.

11. The electrode according to claim 1, wherein the carrier is formed of a dimensionally stable film.

12. The electrode according to claim 1, wherein the underside of the carrier is coated with adhesive.

13. The electrode according to claim 1, wherein the transverse conductor comprises at least two different electrically conductive materials, one of which is galvanically connected to the connecting element and another of which is galvanically connected to the contact medium.

14. The electrode according to claim 13, wherein the transverse conductor is in the form of a layer of a first electrically conductive material, and a second electrically conductive material provided on the first electrically conductive material in a region of the contact medium.

15. The electrode according to claim 14, wherein the first electrically conductive material is a metal or a metal alloy, a plastic film which is conductive throughout or superficially, or a textile material which is conductive throughout or superficially.

16. The electrode according to claim 14, wherein the second material is formed by a pair of silver/silver chloride or tin/tin chloride or another redox pair suitable for depolarising the electrode.

17. The electrode according to claim 1, wherein the holding flange is connected to the carrier and the transverse conductor, and wherein the holding flange has at least one recess or a bore in its surface.

18. The electrode according to claim 4, wherein bores pass through the holding flange.

19. The electrode according to claim 4, wherein the holding flange includes recesses at a peripheral edge of the holding flange, and wherein the recesses are tooth-shaped or wave-shaped.

20. The electrode according to claim 1, wherein the carrier and the support layer connected thereto has at least one incision in a region beside the connecting element, which incision allows mobility of the connecting element with respect to a plaster layer provided for gluing to the skin.

21. The electrode according to claim 1, wherein an electrically conductive adhesive is provided between the transverse conductor and the connecting element or a portion of the holding flange.

22. The electrode according to claim 1, wherein the connecting element is pre-mounted on the electrode and permanently connected thereto.

23. The electrode according to claim 2, wherein the connecting element comprises a deep-drawn metal sheet or acrylonitrile butadiene styrene (ABS) doped with conductive carbon fibres.

24. The electrode according to claim 6, wherein the contact medium is arranged in a recess of a plaster layer, and is a gel doped with chlorides.

25. The electrode according to claim 1, wherein a reduced-diameter neck of the connecting element projects through the opening.

26. The electrode according to claim 1, wherein the support layer is glued to the carrier.

27. The electrode according to claim 8, wherein the plaster layer can be glued on the skin by means of a patient-side coating made of biocompatible adhesive.

28. The electrode according to claim 9, wherein the plaster layer can be glued on the skin by means of a patient-side coating made of biocompatible adhesive.

29. The electrode according to claim 11, wherein the carrier is formed of a dimensionally stable film of polyethylene terephthalate (PET).

30. The electrode according to claim 12, wherein the adhesive is self-adhesive or thermally activatable.

31. The electrode according to claim 14, wherein the layer of the first electrically conductive material is a strip-shaped layer, and the second electrically conductive material is coated on the first electrically conductive material only in the region of the contact medium.

32. The electrode according to claim 17, wherein the holding flange is glued to the carrier and the transverse conductor.

33. An electrode for application to human skin, comprising:
an electrically non-conductive carrier having a top side and an underside opposite the top side, the underside being configured to face skin of a user;
an electrically conductive connecting element projecting from the top side of the carrier remote from the skin, the connecting element having a connection location for releasably connecting a separate signal conductor; and
a transverse conductor arranged so as to electrically connect the connecting element to a contact medium facing the skin,
wherein the connecting element is formed of a single part which is in connected relationship with the transverse conductor and has the connection location for releasably connecting the separate signal conductor,
wherein the connecting element and the contact medium are arranged at laterally mutually displaced locations on the carrier,
wherein the transverse conductor has flat regions and is attached to the underside of the carrier,
wherein the connecting element has a holding flange which projects laterally from the connecting element, the holding flange being attached to an underside of the transverse conductor such that the holding flange is spaced apart from the underside of the carrier via the transverse conductor,
wherein a support layer is attached to an underside of the holding flange such that the holding flange is arranged between the support layer and the underside of the transverse conductor relative to a thickness direction, and wherein the support layer extends laterally beyond the holding flange of the connecting element such that laterally outer portions of the support layer are connected to the underside of the carrier,
wherein the connecting element projects through an opening in the carrier, and
wherein the carrier, the transverse conductor, the holding flange and the support layer are pressed in the thickness direction so as to form a stepped configuration in which
the transverse conductor forms a step along an upper surface of the holding flange, a laterally outer side surface of the holding flange, and an upper surface of the support layer, and
the carrier forms steps along upper surfaces and laterally outer side surfaces of the transverse conductor, and along the upper surface and a laterally outer side surface of the support layer.

34. A method of producing the electrode according to claim 1, the method comprising:
applying the transverse conductor to the underside of the electrically non-conductive carrier;
producing a through opening through the transverse conductor and the carrier;
introducing the connecting element from the underside of the carrier into the through opening, such that the connection location for a signal conductor projects from the top side of the carrier and the connecting element bears with the holding flange against the transverse conductor; and
covering the holding flange of the connecting element with a support layer which is glued to the carrier laterally beside the holding flange.

35. The method according to claim 34, further comprising:
applying a plaster layer which is adhesive on the underside of the carrier or the support layer; and
introducing an electrical contact medium into a recess in the plaster layer such that the transverse conductor is contacted.

* * * * *